May 24, 1938.    R. P. PROFFITT    2,118,767
ROLLER BEARING
Filed March 30, 1936

INVENTOR:
Russell P. Proffitt,
by Carr Kan & Gravely,
HIS ATTORNEYS.

Patented May 24, 1938

2,118,767

UNITED STATES PATENT OFFICE 2,118,767

ROLLER BEARING

Russell P. Proffitt, Chicago, Ill., assignor to The Timken Roller Bearing Company, Canton, Ohio, a corporation of Ohio Application March 30, 1936, Serial No. 71,587

2 Claims. (Cl. 308—174)

My invention relates to roller bearings, particularly to taper roller bearings of the radial type that are so mounted as to be subject to end thrust in both directions. The invention has for its principal object to enable such a bearing to better withstand end thrust. It is particularly adapted for use in automobile drive axles of the fixed hub or semi-floating type. In constructions of this type, it is common practice to use a duplex taper roller bearing, so that the bearing at each end of the axle can withstand end thrust in both directions. Where a single taper roller bearing is used, it is necessary to have the axle sections abut against each other so as to transmit end thrust from one bearing to the other. This involves adjustment of the two bearings against each other instead of independently. A principal object of the present invention, therefore, is to dispense with the necessity for abutment of the two axle sections by enabling each wheel bearing to withstand end thrust in both directions.

The invention consists principally in mounting a thrust plate adjacent to the large end of the inner bearing member of the bearing and interposing an annular series of balls between said plate and the end of the inner bearing member. The invention further consists in the roller bearing and in the parts and combinations and arrangements of parts hereinafter described and claimed.

Figure 1:
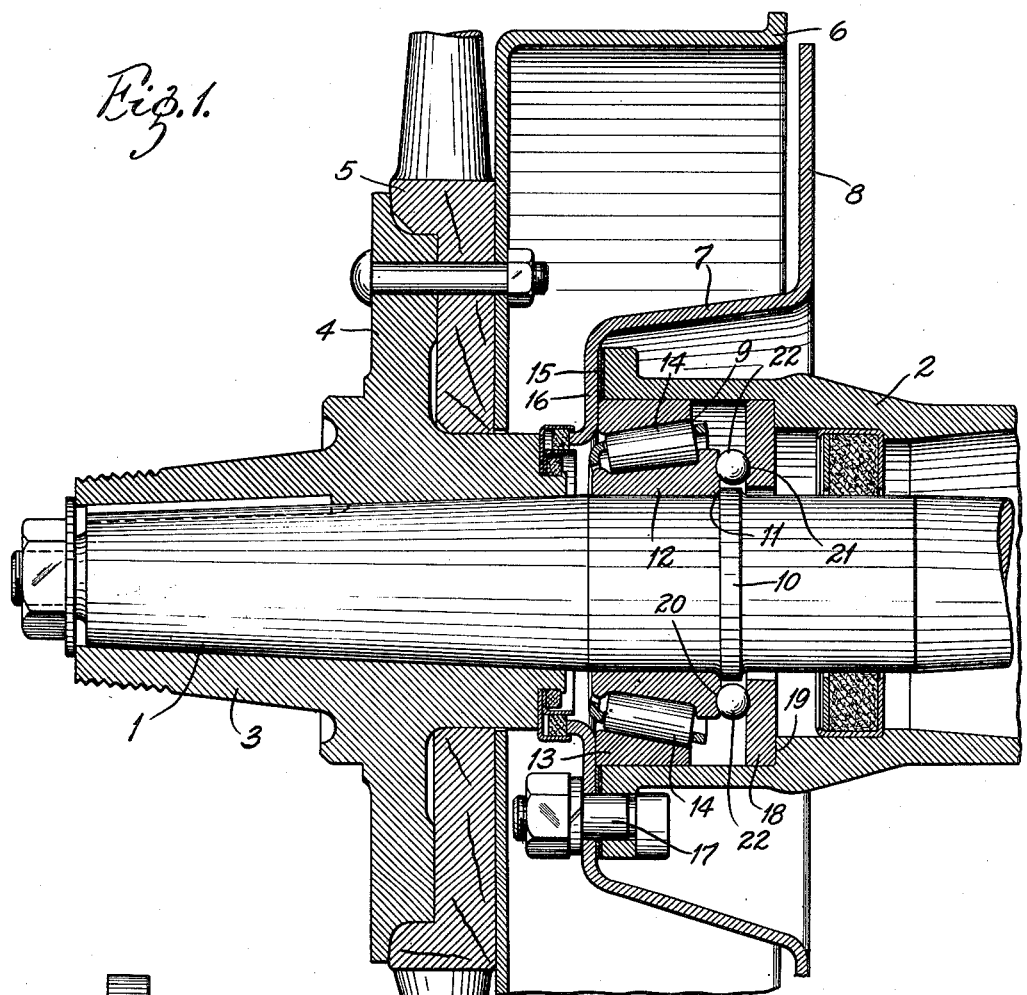
Figure 2:
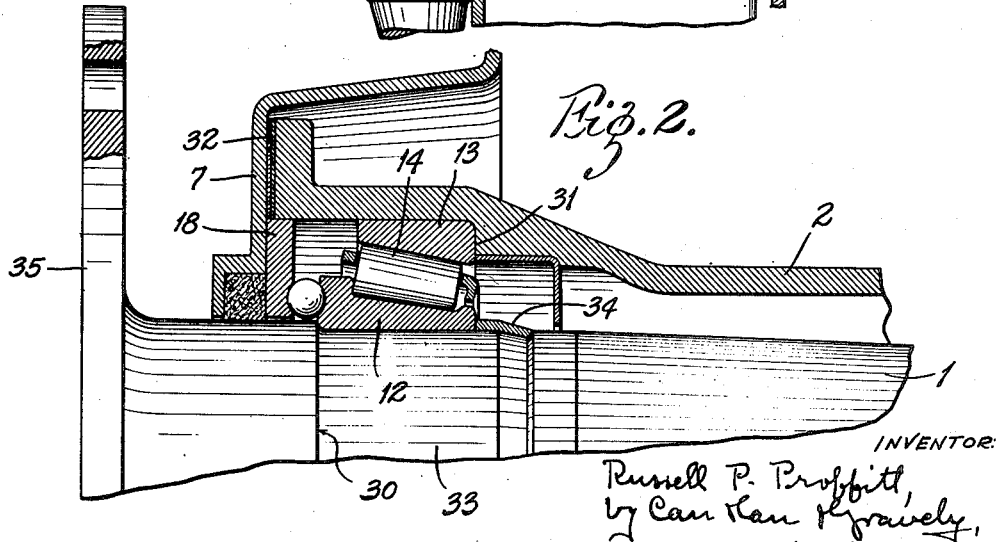

In the accompanying drawing,

Fig. 1 is a longitudinal sectional view of a roller bearing embodying my invention mounted in an automobile drive axle, and Fig. 2 is a similar view showing a modified mounting arrangement for such a bearing.

The drawing illustrates an automobile drive axle of the fixed hub or semi-floating type including an axle section 1, an axle housing 2 therefor terminating short of the outer end of the axle section, a sleeve 3 fixed on the outer end of said axle and having a radial disk portion 4 supporting a vehicle wheel 5 and brake drum 6, a closure 7 for the end of the axle housing, said closure having a flanged portion 8 supporting the brake mechanism and a roller bearing 9 interposed between the end of the housing and the axle.

According to the embodiment of my invention shown in Fig. 1, the axle 1 is provided with a shoulder 10 having an outwardly facing wall against which is seated the large end 11 of the cone or inner bearing member 12 of a taper roller bearing 9. The cup 13 or outer bearing member is mounted in the end of the housing 2 and the taper rollers 14 are mounted between the cup 13 and cone 12 with their small ends directed outwardly, this arrangement of the bearings at the two ends of the axle being known as a direct mounting. The cup 13 projects slightly beyond the end of the housing 2 and adjustment of the bearing is obtained by means of shims 15 interposed between the end of the housing 2 and a radially extending portion 16 of the housing closure member 7 that overlaps the end of the housing 2. The closure member 7 is secured to the end of the housing, as by bolts 17.

Adjacent to the large end of the bearing cone 12 is a radially disposed annular plate 18 which is seated against an annular seat 19 provided therefor in the housing. An annular groove 20 constituting a ball raceway is formed in the large end face of the bearing cone and a cooperating annular groove 21 is formed in the opposed face of said thrust plate 18, an annular series of balls 22 running in said opposed grooves. The balls extend around the axle shoulder 10, but preferably do not touch it.

By this arrangement, end thrust outwardly of the axle is taken up in the taper roller bearing 9 and axle housing 2 and end thrust inwardly of the axle is taken up in the ball thrust bearing and housing. Thus, the combined taper roller and ball bearing is able to withstand end thrust in both directions and it is unnecessary for the axle section to contact with the other axle section so as to make the two bearings work together.

Fig. 2 shows a similar axle arrangement having an indirect mounting of the bearings, that is the taper rollers 14 are disposed with their small ends inwardly of the axle 1. The bearing cone 12 has its large end seated against an inwardly facing shoulder 30 on the axle. The bearing cup 13 is seated against an internal shoulder 31 formed in the housing 2. The annular thrust plate 18 that forms one of the raceways for the thrust balls is mounted in the end of the housing and held in position by means of the closure plate 7, shims 32 interposed between the end of the housing and said plate constituting the bearing adjusting means. The bearing is mounted on a reduced portion 33 of the axle and a ring 34 is interposed between the small end of the cone and a shoulder on the axle. A radial flange 35 at the outer end of the axle constitutes a mounting piece for the wheel and brake drum.

The construction shown in Fig. 2 functions similarly to that shown in Fig. 1 to take up end thrust in either direction.

The combined taper roller and ball thrust bearing is compact in construction and carries radial load as well as withstanding end thrust in both directions. It thus makes possible the simplification of the axle construction by dispensing with contact between the ends of the two axle sections. Obviously, the bearing may be used in other relations than that shown in the drawing and numerous changes may be made without departing from the invention.

What I claim is:

1. An axle having an outwardly facing shoulder, a housing therefor having an outwardly-facing internal annular seat inwardly beyond said axle shoulder, a radial type taper roller bearing interposed between said axle and said housing, the outer bearing member being mounted in the end of said housing and the inner bearing member of said taper roller bearing being seated on said axle with its large end against said axle shoulder, the end face of said large end of said inner bearing member having an annular ball raceway formed therein, an annular thrust plate seated in said housing against said internal seat and having an annular ball raceway, an annular series of balls mounted in said raceways and positioning means secured to said housing and engaging the outer end of said outer bearing member.

2. An axle having an outwardly facing shoulder, a housing therefor having an outwardly facing internal annular seat inwardly beyond said axle seat, a radial type taper roller bearing interposed between said axle and said housing, the outer bearing member being mounted in the end of said housing and the inner bearing member of said taper roller bearing being seated on said axle with its large end against said axle shoulder, the end face of said large end of said inner bearing member having an annular ball raceway formed therein, an annular thrust plate seated in said housing against said internal seat and having and having an annular ball raceway, an annular series of balls mounted in said raceways, and a closure for the end of said housing engaging the outer end of said outer bearing member.

RUSSELL P. PROFFITT.